United States Patent Office 2,931,827
Patented Apr. 5, 1960

2,931,827

CITRIC ACID ESTERS AND PROCESS OF PRODUCING SAME

Arno Debo, Heidelberg, Germany, assignor to Joh. A. Benckiser G.m.b.H. Chemische Fabrik, Ludwigshafen (Rhine), Germany, a corporation of Germany No Drawing. Application April 9, 1959
Serial No. 805,128

Claims priority, application Germany November 22, 1958

4 Claims. (Cl. 260—461)

The present invention relates to new citric acid esters and more particularly to citric acid esters esterified with thiophosphoric acid diesters, and to a process of producing said compound.

It is one object of the present invention to provide new citric acid esters which are esterified in their hydroxyl group by thiophosphoric acid diesters.

Another object of the present invention is to provide a simple and effective process of making such new and valuable citric acid esters.

Other objects of the present invention and advantageous features thereof will become apparent as the description proceeds.

In principle the new citric acid esters according to the present invention correspond to the formula

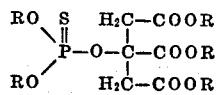

wherein R indicates the same or different alkyl radicals and preferably lower alkyl radicals.

Such compounds are obtained according to the present invention by adding a corresponding chlorothiophosphoric acid diester at room temperature to a solution of a citric acid triester and a tertiary organic base in an inert solvent, while stirring. To complete the esterification of the hydroxyl group of the citric acid triester, the reaction mixture is kept for several hours at a temperature between about 50° C. and about 80° C. After cooling, the hydrochloride of the base is removed by filtration or by washing with water.

Suitable inert solvents which may be used in the process according to the present invention are, for instance, saturated aliphatic and aromatic hydrocarbons and especially benzene and its homologues.

Useful tertiary bases are, for instance, tertiary aromatic bases such as dimethyl aniline, diethyl aniline and their homologues, heterocyclic bases such as pyridine and its homologues, or lower trialkylamines such as trimethylamine, triethylamine, and the like. Purification of the resulting esters is considerably simplified if a water-soluble base is used.

The compounds obtained according to the present invention are soluble in almost all organic solvents. They are insoluble in water. The compounds are useful as plasticizers for plastics, especially for PVC.

The following example serves to illustrate the present invention without, however, limiting the same thereto.

EXAMPLE

*Dipropyloxy thiophosphoryl citric acid triethyl ester*

$(n\text{-}C_3H_7O)_2P(S)OC(CH_2COOC_2H_5)_2COOC_2H_5$ 43.3 g. of chlorothiophosphoric acid dipropyl ester are added drop by drop at room temperature to a solution of 16 g. of pyridine and 55.3 g. of citric acid triethyl ester in 100 cc. of benzene, while stirring. After the addition is completed, the reaction mixture is stirred at 50–60° C. for four more hours. The mixture is cooled. Precipitated pyridine hydrochloride is filtered off and the filtrate is extracted three times with water, each time with 50 cc. of water. The filtrate is dried over sodium sulfate. The benzene is removed by distillation. A brown oily residue is obtained thereby. Said oil is dissolved in ether and is shaken with activated carbon. After filtering off the activated carbon and evaporating the ether by means of a water jet vacuum pump, the dipropyloxy thiophosphoryl citric acid triethyl ester remains in the form of a yellowish oil. Its refractive index: $n_D^{20} = 1.4648$.

*Analysis.*—Calculated: 6.8% P; 7.0% S; 47.4% C; 7.2% H. Found: 7.1% P; 6.8% S; 45.4% C; 7.2% H.

It is, of course, understood that in place of the citric acid triethyl ester there may be used the equivalent amount of another lower alkyl ester of citric acid such as the trimethyl ester, the tri-n-propyl ester, the tri-n-butyl ester, and other esters.

Likewise, in place of chlorothiophosphoric acid di-n-propyl ester there may be employed the equivalent amount of another lower alkyl ester of chlorothiophosphoric acid such as the diethyl ester, the dimethyl ester, the di-n-butyl ester, and others. The procedure is otherwise the same as described in the preceding example.

I claim:

1. The citric acid ester of the formula

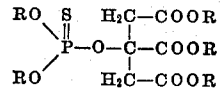

wherein R indicates a lower alkyl radical.

2. The di-n-propyloxy thiophosphoryl citric acid triethyl ester.

3. In a process of producing a citric acid ester of the formula

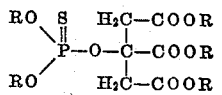

where R is a lower alkyl radical, the steps which comprise adding a chlorothiophosphoric acid di-lower alkyl ester at room temperature to a citric acid tri-lower alkyl ester in the presence of a tertiary organic base in an inert organic solvent and heating the reaction mixture to a temperature between about 50° C. and about 80° C. until esterification of the hydroxyl group of the citric acid triester is completed.

4. In a process of producing a citric acid ester of the formula

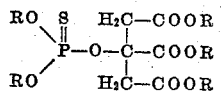

where R is a lower alkyl radical, the steps which comprise adding a chlorothiophosphoric acid di-lower alkyl ester at room temperature to a citric acid tri-lower alkyl ester in the presence of a pyridine base in a benzene hydrocarbon solvent and heating the reaction mixture to a temperature between about 50° C. and about 80° C. until esterification of the hydroxyl group of the citric acid triester is completed.

No references cited.